United States Patent [19]

MacKenzie et al.

[11] E Re. 31,307

[45] Reissued Jul. 12, 1983

[54] METHOD FOR PREPARING CLAY-BASED GREASE COMPOSITIONS

[75] Inventors: Kenneth A. MacKenzie, Burlington; Abraham Verhoeff, Toronto, both of Canada

[73] Assignee: Shell Internationale Research Maatschap, IIJ B.V., The Hague, Netherlands

[21] Appl. No.: 192,060

[22] Filed: Sep. 29, 1980

Related U.S. Patent Documents

Reissue of:

[64] Patent No.: 4,122,022
Issued: Oct. 24, 1978
Appl. No.: 815,691
Filed: Jul. 14, 1977

[30] Foreign Application Priority Data

Aug. 3, 1976 [CA] Canada ..... 258332
Aug. 3, 1976 [CA] Canada ..... 258332

[51] Int. Cl.[3] ..... C10M 1/10; C10M 3/02; C10M 5/02; C10M 7/04

[52] U.S. Cl. ..... 252/28; 252/52 R

[58] Field of Search ..... 252/28, 52 R

[56] References Cited

U.S. PATENT DOCUMENTS

| | | | |
|---|---|---|---|
| 2,836,560 | 5/1958 | Teale et al. | 252/28 |
| 2,939,121 | 3/1956 | Weihe et al. | 252/28 |
| 3,222,279 | 12/1965 | Loeffler | 252/28 |

FOREIGN PATENT DOCUMENTS

| | | | |
|---|---|---|---|
| 913053 | 10/1972 | Canada | 252/28 |

*Primary Examiner*—Thomas A. Waltz
*Attorney, Agent, or Firm*—Pravel, Gambrell, Hewitt, Kirk & Kimball

[57] ABSTRACT

An improved method for preparing clay-based grease compositions is described whereby a clay containing pre-grease is prepared and a water separated from the clay-bearing pre-grease prior to the addition of an epoxide which is cured, e.g., simultaneously with the dehydration of the pre-grease. The grease compositions prepared in this manner show improved water resistance over those wherein the epoxide is added prior to separation of the water phase and the grease is also more responsive to the addition of conventional grease additives such as extreme pressure additives, anti-corrosion additives and anti-oxidants.

19 Claims, No Drawings

METHOD FOR PREPARING CLAY-BASED GREASE COMPOSITIONS

Matter enclosed in heavy brackets [ ] appears in the original patent but forms no part of this reissue specification; matter printed in italics indicates the additions made by reissue.

BACKGROUND OF THE INVENTION

This invention relates to an improved method for the preparation of clay-bearing grease compositions.

In the past, as described by U.S. Pat. No. 3,006,848 for example, clay-bearing grease compositions are prepared by direct interchange of the clay from an aqueous phase to an oil phase by the addition of a hydrophobic amine which coats the surface of the clay converting the clay to one having an oleophilic hydrophobic surface. Further, as described in Canadian Pat. No. 731,131 (U.S. Pat. No. 3,222,279), polyepoxides are known to have been added to the clay dispersion to produce a resin-coated clay. As described in such Canadian Patent, the polyepoxide and amine are added to an acidified clay hydrogel. Curing is then accomplished to form a resin in the presence of an acid. This is followed by separating the water phase from the clay. The coated clay is then mixed with lubricating oil. As described in the Canadian Patent a small amount of strong mineral acid must be added to the clay dispersion prior to the incorporation of the polyepoxide resin. Water separation must take place after the resin is cured.

Canadian Pat. No. 913,053 describes avoiding the acidification step as described in Canadian Pat. No. 731,131 by utilizing a hydrophobic surfactant defined as "conjugate acids of aliphatic amines and aliphatic amine oxides."

Amines which form suitable conjugate acid surfactants include primary, secondary and tertiary amines having at least one long chain aliphatic group attached to the nitrogen atom, the total number of carbon atoms of said group or groups being from about 14 to about 24. Amines containing predominantly saturated, unbranched, aliphatic groups have been found to form extremely oxidation-resistant grease compositions. Amines of this type include tallow amines, especially hydrogenated primary, secondary, or tertiary tallow amines, e.g., dimethyl hydrogenated tallow (tertiary) amine and hydrogenated tallow (primary) amine. Saturated aliphatic primary amines having from 16 to 18 carbon atoms have been found to form particularly advantageous conjugate acid surfactants. Such amines are commercially available under the trademark Armeen HT.

Amine oxides suitable for forming the conjugate acid hydrophobing agents of the invention include primary, secondary and tertiary aliphatic amine oxides having a total of from about 14 to about 24 carbon atoms. Amine oxides which form especially advantageous conjugate acids are tertiary aliphatic amine oxides such as dimethyl alkyl amine oxides, particularly dimethyl hydrogenated tallow amine oxide.

The aforedescribed amines and amine oxides are converted to their conjugate acid form by reaction with an acid having a pKa value from 1 to 5. As used throughout this disclosure, pKa identifies the negative log of Ka which is the ionization constant defined by the equation:

$$Ka=([H+][A-])/[HA]$$

wherein HA is an acid, H+ is hydrogen ion and A− is an anion. Of the acids having pKa values within the above specified range, $C_1$ to $C_4$ aliphatic monocarboxylic acids form a preferred class of conjugate acids, particuarly acetic acid.

The aforesaid conjugate acid surfactants are preferably employed in the present compositions in relatively low concentrations, e.g., 30 to 60% by weight, more preferably, 30 to 40% by weight, based on the weight of the clay. Higher surfactant concentrations, for example, up to 125% by weight basis of the clay can be used, if desired. The use of such high concentrations of surfactant would, of course, be economically less attractive and for this reason are normally not employed.

The use of these materials are described to improve the clay-bearing grease over those previously used. The invention described herein is still yet another improvement in the method for preparing clay-bearing grease over those previously used.

SUMMARY OF THE INVENTION

This invention relates to a process for preparing clay-based grease compositions and to grease compositions thus prepared, which show an improved water resistance and mild extreme pressure properties as well as an improved response to certain additives. It has been found that greases, based on cationically coated clay as thickener, although showing no dropping point and good pumpability, have a poor response to certain conventional grease additives, such as extreme pressure additives, anti-corrosion additives and anti-oxidants and furthermore can be improved as to their water resistance and their response to low-shear stirring.

According to this invention these problems can be solved if an epoxide is reacted with the clay surface bound cationic oleophilic coating agent under certain conditions at a certain point in the method of preparing the grease. This invention, therefore, relates to a method for preparing a grease composition which comprises:

(a) forming a clay hydrogel of clay of sufficient ion exchange capacity and water;

(b) intimately mixing therewith a conjugate acid surfactant formed from an acid and an organic amine compound;

(c) intimately mixing with the mixture formed in (b) a major proportion of lubricating oil whereby a water phase and a pre-grease phase comprising curds of oil, clay, surfacent and minor amounts of water are formed;

(d) separating the water phase from the wet pre-grease phase;

(e) adding to the pre-grease a minor proportion of an epoxide before or after dehydration;

(f) reacting the epoxide with the unoccupied amine groups of the amine;

(g) subjecting the resulting pre-grease to a shearing action sufficient to form a grease structure.

Stated in terms of the improvement over the art, this invention is an improved method for preparing a clay-bearing grease composition whereby an epoxide is added to a dewatered clay-bearing pre-grease which epoxide is cured during further dehydration of the pre-grease at a temperature not greater than 250° F. The dehydration/curing step is followed by mixing the pre-grease to a shearing action sufficient to form a grease structure.

DESCRIPTION OF THE PREFERRED EMBODIMENTS

As stated previously, Canadian Patent Specification No. 731,131 describes a clay-based grease containing a clay coated with a polyepoxide resin as water-proofant. However, the Canadian specification describes mixing the clay hydrogel first with an acid and then with the polyepoxide and an organic amine, heating the mixture to effect curing, separating the water phase, mixing the wet coated clay with lubricating oil, dehydrating and milling. It is furthermore silent on the use of the aforementioned additives and the inherent problems of a poor response as mentioned hereinbefore.

Lubricating oils are well known and can be a mineral oil or a synthetic lubricating oil, such as an ester oil, a silicone oil or a polyphenyl ether, for example.

The clay should preferably have a high ion-exchange capacity, such as a bentonitic clay. Wyoming Bentonite or Hectorite, for example, are preferred. Suitable proportions of coated clay are from about 2 to about 20% by weight, in particular from 4 to 10% by weight based on the final composition.

Suitable coating agents for the clay are conjugate acid surfactants, as discussed hereinbefore, and should contain at least two amine groups. These agents include aliphatic, cycloaliphatic, aromatic or heterocyclic polyamines, amides and polyamides and derivatives thereof.

Examples of these materials include: fatty diamines, reaction products of fatty acids and polyalkylene polyamines, and fatty polyamines. Examples are fatty ethylene or propylene diamines or polyamines.

Other examples include the polyamines possessing one or more cycloaliphatic rings, such as, for example, 1,4-diaminocyclohexane. Preferred members of this group comprise those polyamines having at least one amine or alkyl-substituted amino group attached directly to a cycloaliphatic ring containing from 5 to 7 carbon atoms.

Another group comprises the aminoalkyl-substituted aromatic compounds, such as, for example, di(aminoethyl)benzene, di(aminomethyl)benzene, tri(aminoethyl)benzene and 2,4,6-tris(dimethylaminomethyl)phenol.

Another group comprises the polymeric polyamines, such as may be obtained by polymerizing or copolymerizing unsaturated amines, such as allyl amine or diallylamine, alone or with other ethylenically unsaturated compounds. Alternatively, such polymeric products may also be obtained by forming polymers or copolymers having groups reactive with amines, such as, for example, aldehyde groups, as present in acrolein and methacrolein polymers, and reacting these materials with monomeric amines to form the polymeric polyamines. Still other polymeric amines can be formed by preparing polymers containing ester groups, such as, for example, a copolymer of octadecene-1 and methyl acrylate, and then reacting this with a polyamine so as to effect an exchange of an ester group for an amide group and leave the other amine group or groups free.

Another group comprises the polyamides, obtained as condensation products of polyamines and dimer acids.

Still other materials include piperazine and the N-(aminoalkyl)piperazines, such as, for example, N-aminobutylpiperazine. Coming under special consideration are the N-(aminoalkyl)piperazines wherein the alkyl group in the aminoalkyl portion of the molecule contains no more than 6 carbon atoms, and the total molecule contains no more than 18 carbon atoms.

Of special interest are partial amides of polyethylene polyamines or polypropylene polyamines and fatty acids, such as tall oil acids or coconut oil acids, as described in U.S. Pat. No. 3,006,848, the disclosure of which is incorporated herein by reference.

The mixture of high molecular weight polyethylene polyamines is normally obtained as a bottoms product in the process for the preparation of ethylene diamine. Consequently, it normally constitutes a highly complex mixture and even may include small amounts (less than about 3% by weight) of oxygenated materials. A typical mixture of polyethylene polyamines diluted with about 25% by weight of diethylene triamine has the following analysis:

Percent by weight carbon 51.5
Percent by weight nitrogen 34.3
Percent by weight hydrogen 11.6
Percent by weight oxygen 2.5

Total basicity, equivalents per 100 grams = 1.98, equivalent to 27.7% nitrogen.
Active nitrogen = 81%.
Amine types, equivalents per 100 grams: Primary, 1.20 and tertiary, 0.30.
Specific gravity at 25° C.: 0.995–1.020.
Viscosity: 75–250 centipoises.
Equivalent weight: 42.5–47.5.

Suitable acids used in the formation of the conjugate acid surfactant are phosphoric acid or a $C_1$ to $C_4$ aliphatic monocarboxylic acid, acetic acid being the preferred member of this latter group.

Suitable proportions of the conjugate acid surfactant are from 10% by weight to 150% by weight of the stoichiometric amount needed to counteract the anionic charges on the clay. The clay is preferably titrated with the conjugate acid surfactant to about a zero electrometric potential, preferably in line, and the intimate mixing of conjugate acid surfactant, clay hydrogel and lubricating oil is preferably accomplished by means of turbulent pipeline flow, as described in Canadian Patent Specification No. 913,053 with about 10 seconds of such turbulent flow being sufficient.

After the mixing of the conjugate acid surfactant, as set forth above, the lubricating oil is added to the aqueous mixture. A pre-grease phase and water phase is formed. Suitable lubricating oils, as stated before, are well known and for purposes of this invention it is only a matter of selection on the part of the skilled artisan.

In the practice of this invention, the water phase is now separated from the pre-grease phase which contains curds of oil, clay, surfactant and minor amounts of water. This separation is performed by mechanical means such as filtration or centrifuging. Further, more water may be "squeezed" from the pre-grease constituents by stirring followed by mechanical separation.

To this pre-grease is now added an epoxide in proportions of from about 0.1 to about 20% by weight and preferably from about 0.1 to about 10% by weight, based on the wet pre-grease which still contains a small amount of water to be removed as hereinafter described.

Suitable epoxides are mono- and polyepoxides and derivatives thereof. They contain at least one epoxide group and preferably should not contain groups highly reactive to water, such as isocyanate groups. The epoxides can be saturated or unsaturated, aliphatic, cycloaliphatic, aromatic or heterocyclic compounds. They can, e.g., be used in liquid form or in solution.

For clarity, many of the epoxides are particularly those of the polymeric type are described in terms of epoxy equivalent value. If the epoxide consists of a single compound and all of the epoxy groups are intact, the epoxy equivalency will be integers, such as 2, 3, 4 and the like. However, in the case of polymeric type epoxides, many of the materials may contain some of the monomeric mono-epoxides or have some of their epoxy groups hydrated or otherwise reacted and/or contain macromolecules of somewhat different molecular weight so that epoxy equivalent values may be quite low and contain fractional values. The polymeric material may, for example, have epoxy equivalent values, such as 1.5, 1.8, 2.5 and the like.

Examples of polyepoxides include, among others, 1,4-bis(2,3-epoxypropoxy)benzene, 4,4'-bis(2,3-epoxypropoxy)cyclohexane.

Coming under special consideration are the epoxy polyethers of polyhydric phenols obtained by reacting a polyhydric phenol with a halogen-containing epoxide or dihalohydrin in the presence of an alkaline medium. Polyhydric phenols that can be used for this purpose include, among others, resorcinol, catechol, hydroquinone, or polynuclear phenols, such as 2,2-bis(4-hydroxyphenyl)propane (Bisphenol A), 4,4'-dihydroxybenzophenone, and 1,5-dihydroxynaphthalene. The halogen-containing epoxides may be exemplified by 3-chloro-1,2-epoxypropane (epichlorohydrin) and 3-chloro-1,2-epoxybutane. Esters of epoxy compounds and, e.g., acrylic acids can also be used.

The monomer products produced by this method from dihydric phenols and epichlorohydrin may be represented by the general formula:

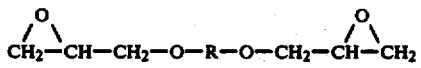

wherein R represents a divalent hydrocarbon radical of the dihydric phenol. The polymeric products will generally not be a single simple molecule but will be a complex mixture of glycidyl polyether of the general formula:

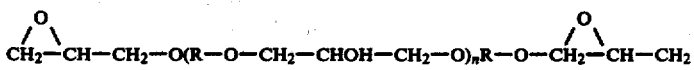

wherein R is a divalent hydrocarbon radical of the dihydric phenol and n is an integer of the series 0, 1, 2, 3, etc. While for any single molecule of the polyether n is an integer, the fact that the obtained polyether is a mixture of compounds causes the determined value for n to be an average which is not necessarily a whole number.

Especially preferred are liquid polyglycidyl polyethers, such as the diglycidyl ether of a diphenylol propane, e.g., 2,2-bis(4-hydroxyphenyl)propane.

After adding and mixing the epoxide, the remaining water is removed by distillation at a temperature not greater than 250° F., preferably by distillation under a vacuum. This water removal step serves to both dry the grease and, at the same time, to cure the epoxide. For a reason not fully understood, accomplishing these steps at this point in the method of preparing the clay-based grease, other additives such as anti-oxidants, anti-corrosion additives, and extreme pressure additives may be incorporated into the mixture with desirable results.

Suitable extreme pressure additives are lead naphthenate, other organic metal salts, sulphurized fatty oils and derivatives and other sulphurized organic compounds.

Suitable anti-corrosion additives are nitrites, such as sodium nitrite, organic metal salts and sulphurized fatty oils.

Suitable anti-oxidants are phenothiazines, such as N-benzylphenothiazine, phenolic compounds, aromatic amines, organic metal salts and sulphurized fatty oils.

Mixtures of these additives as well as other well known additives may be used.

The proportions of each of the additives can range between 0.1 and 20% by weight, based on the final composition, although the total amount of additives should constitute a minor proportion of the total grease composition.

According to the present preparation method the epoxides are added to the clay-based pre-grease. Such a pre-grease can, for example, be prepared by mixing an aqueous slurry of the clay, containing from about 0.25 to about 3% by weight dry clay in the slurry for example, with a conjugate acid surfactant of an amine solution prepared by adding fatty amine or amido-amine to acidified water (preferably acetic or phosphoric acid) in an optimum ratio of clay to conjugate acid surfactant coating agent as previously mentioned herein. A lubricating oil is added to this mixture, at which point the coated clay transfers to the oil and the largest proportion of water is shed and subsequently drained. After the drain at this point sodium nitrite in the form of a 40% aqueous solution can be added and the excess water is removed, e.g., by distillation under vacuum to a temperature not higher than 250° F. This procedure produces a normal clay grease. By adding the appropriate amount of epoxide after the initial water drain, but before stripping of the remaining water (along with any make-up oil and such additives which are unaffected by the still present water), the polymerization of the polyepoxide takes place during the drying step. Drying in this case is preferably also carried out under vacuum and at a temperature not higher than about 250° F. Drying time may take from about 1 to about 15 hours to reduce the water level to preferably less than 1% by weight of the grease composition. Some grease composition may tolerate higher water levels, and lower levels are obtainable in the practice of this invention. The pre-grease is then cooled and milled to the proper consistency by means of an homogenizer applying pressures up to, for example, about 6000 psi using known procedures.

Other additives which would suffer under high temperatures and hydrolysis can be added after cooling and before milling.

EXAMPLE I 20.1 kg of a Hectorite clay hydrogel containing 2.32 weight percent total solids were mixed and reacted in-line with 5.4 kg of a solution containing 5% amide-amine, being the reaction product of tall oil fatty acids (14 to 22 carbon atoms) and polyethylene polyamines, and 0.7% phosphoric acid in water. 3078 grams of a mineral oil having a viscosity of 75 to 85 SSU at 210° F. were then added to the mixture and the combined materials mixed in-line and transferred to a kettle. The material had the appearance of firm curds or pearls from which water freely drained. The separated water phase was drained from the kettle and additional water squeezed out by stirring. At this point 190 grams of a commercial diglycidyl ether of diphenylol propane were added and the remaining water was removed by means of a vacuum distillation to dryness. After drying and cooling the grease was diluted with additional make-up oil and milled to a clay content of 5 weight percent. Part of the make-up mass was 1.5 weight percent lead naphthenate and 4.5 weight percent sulphurized fatty oil (extreme pressure (EP) additives). The grease was milled through a homogenizer to a final penetration of approximately 300. The composition and properties of this grease coded PP-185 are given in the Table.

EXAMPLE II

Another batch was made in the same pilot plant following the same procedure, however, at the end of the drain 0.6 weight percent of sodium nitrate (basis final weight) was added along with the polyepoxide. Also, the lead naphthenate and sulphurized fatty oil were omitted from the make-up oil resulting in a non-EP epoxy resin grease marked PP-183 in the Table.

EXAMPLE III

Finally, a batch was made omitting both the polyepoxide and the EP package but incorporating sodium nitrite. This batch, marked PP-184, serves for comparison with the non-EP and EP version of the present invention.

The following Table shows the properties of the greases described in Examples 1, 2 and 3.

TABLE IA

| Batch No. | FORMULATIONS PP 184 (Example 3) | PP 183 (Example 2) | PP 185 (Example 1) |
|---|---|---|---|
| Clay | 5.1 | 5.1 | 5.0 |
| Amine-Amide Coating Agent | 3.0 | 3.0 | 3.0 |
| Mineral Oil | 91.0 | 89.2 | 83.8 |
| Sodium nitrite | 0.6 | 0.6 | |
| Lead naphthenate | | | 1.5 |
| Sulphurized fatty oil | | | 4.5 |
| Water | 0.3 | 0.1 | 0.2 |
| Polyepoxide | | 2.0 | 2.0 |
| Total, % weight | 100.0 | 100.0 | 100.0 |

TABLE IB

| | TEST RESULTS PP 184 | PP 183 | PP 185 |
|---|---|---|---|
| ASTM D217 penetration | | | |
| unworked | 302 | 298 | 308 |
| 60X (X = strokes) | 308 | 300 | 308 |
| 100,000X | 335 | 336 | 336 |
| +0.1% water, 60X | 295 | 300 | 308 |
| +10% water, 100,000X | semi-fluid | 410 | 308 |
| +50% water, 100,000X | semi-fluid | 342 | 358 |
| after wheel bearing test at 275° F., 60X | 470 | 295 | 302 |
| ORC Dynamic corrosion test(1) | | | |
| No. of cycles pass | 0 | 0 | 3 |

TABLE IB-continued

| | TEST RESULTS PP 184 | PP 183 | PP 185 |
|---|---|---|---|
| ASTM D942 oxidation | | | |
| psi drop in 100 hours | 12 | 13 | 6 |
| psi drop in 500 hours | 30 | 23 | 14 |
| ASTM D2509 Timken EP test | | | |
| OK load, lbs | <20 | 30 | 65 |
| ASTM D2265 dropping point, °C. | none | none | none |
| ASTM D1264 water wash-out at 175° F. % w | 10 | 4 | 3 |
| Bethlehem Steel Co. water spray resistance test, LT-20, % w washed off | 97 | 66 | 58 |
| ASTM D1263 wheel bearing test at 275° F., grams bleed | 5 | 1 | 1 |
| ORC high temperature wheel bearing test(2) hours to failure | 20 | 135 | 212 |
| U.S. steel mobility test grams/sec. at 77° F. | 10 | 6 | 6 |
| Fafnir fretting test(3) mg loss | 35 | 22 | 21 |
| ASTM D2266 Four Ball Wear scar dia., mm | 0.6 | 0.8 | 0.5 |
| ASTM D2596 Four Ball EP Test | | | |
| 4 ball weld kg | 126 | 160 | 250 |
| last non-seizure load kg | 80 | 100 | 100 |
| load wear index | 33 | 41 | 45 |
| General Motors low temperature Torque test, GM9078-P, at −40° F., inch lb | | | |
| starting | 112 | 158 | 117 |
| running | 68 | 90 | 79 |

Description of test:

(1)ORC Dynamic Corrosion - using ASTM D1263 Wheel Bearing Tester, heat to 160° F., add 55 ml of 25% Synthetic Sea Water to hub, cool and runfor 6 hours. Then 18 hours cold rest. Any evidence of corrosion on greased bearings terminates test.

(2)ORC High Temperature Wheel Bearing Test. This is a modification of GM test 9048P. Constant Axial load of 50 lbs., temperature 300° F., RPM 1200.

(3)Fafnir Fretting Test - Spring load 550 psi., RPM 1600, Test Duration 22 hours.

EXAMPLE IV

To an amount of grease PP-184 (Example III) 1.5% w lead naphthenate and 4.5% w sulphurized fatty oil were added. The grease became a semi-fluid, in contrast to grease PP-185 (Example I) which demonstrates the stabilizing effect of the polyepoxide.

EXAMPLE V

For purposes of comparisons:

(a) Using the in-line technique described in Example I, the clay slurry was contacted with a solution of diethylene triamine and phosphoric acid in water and the reacted mixture was mixed with mineral oil. Using a wide variety of reagent ratios it appeared not possible to form curds of pearls and drain the water; and (b) When the in-line method was repeated, incorporating polyepoxide according to the procedure described in Canadian Patent Specification No. 731,131, using acidified clay, it was again not possible to produce pearls and achieve a water drain. Therefore, it was attempted to proceed by vacuum stripping all of the water. When stoichiometric amounts of amine and clay were used (the proper amount of polyepoxide being added to the amine/oil solution), and all water removed by vacuum distillation a slurry was formed which could not be milled into a grease.

The grease prepared by the method of this invention are very suitable for those applications where the combination of mild EP or EP combined with increased water wash-out and water-spray resistance are beneficial; such as automotive, marine and industrial uses.

They are also suitable for applications where temperatures and pressure insensitivity are important, such as aviation uses.

We claim:

1. In the method for preparing a clay-bearing grease which comprises mixing an aqueous clay hydrogel and a conjugate acid surfactant formed from an acid and an organic amine, which mixture is combined, with mixing, with a major proportion of a lubricating oil to result in a pre-grease phase containing the oil, clay and surfactant and a water phase; followed by separating the pre-grease phase from the water phase; the improvement which comprises:

(a) mixing with the pre-grease, from about 0.1 to about 20 weight percent of an epoxide, based upon the weight of the pre-grease before or after a dehydration step;

(b) heating the mixture [to a temperature not greater than 250° F.] to cure the epoxide; and (c) milling the dried and cured mixture to form a clay-bearing grease.

2. The method of claim 1, wherein the curing and dehydration step is performed by vacuum distillation.

3. The method of claim 1, wherein the epoxide is a polyglycidyl polyether.

4. The method of claim 3, wherein the polyglycidyl polyether is the diglycidyl ether of a diphenylol propane.

5. The method of claim 1, wherein the mixing of conjugate acid surfactant clay hydrogel and lubricating oil is accomplished by means of turbulent pipeline flow.

6. The method of claim 1, wherein the clay hydrogel is formed from a bentonitic clay.

7. The method of claim 1, wherein the clay is hectorite clay.

8. The method of claim 1, wherein the acid used in the formation of the conjugate acid surfactant is phosphoric acid.

9. The method of claim 1, in which the acid used in the formation of the conjugate acid surfactant is a $C_1$— to $C_4$— aliphatic monocarboxylic acid.

10. The method of claim 1, wherein the conjugate acid surfactant is formed from a compound selected from the group comprising: reaction products of fatty acids and polyalkylene polyamines, and fatty polyamines.

11. The method of claim 1, wherein the concentration of the conjugate acid surfactant is from 10% w to 150% w of the stoichiometric amount needed to counteract the anionic charges on the clay.

12. The method of claim 1, wherein the clay is titrated with the conjugate acid surfactant to a zero electrometric potential.

13. The method of claim 1, wherein antioxidants, high pressure additives and anti-corrosion additives are added in amounts of from 0.1 to 20% by weight of each additive, based upon the weight of the final grease, the total amount of addivites being a minor portion of the grease.

14. In the method for preparing a clay-bearing grease which comprises mixing an aqueous clay hydrogel and a conjugate acid surfactant formed from an acid and an organic amine, which mixture is combined, with mixing, with a major proportion of a lubricating oil to result in a pre-grease phase containing the oil, clay and surfactant and a water phase; followed by separating the pre-grease phase from the water phase; the improvement which comprises:

(a) mixing with the pre-grease, from about 0.1 to about 20 weight percent of a polyepoxide, based upon the weight of the pre-grease;

(b) heating the mixture to a temperature not greater than 250° F. to simultaneously cure the polyepoxide and dehydrate the mixture; and (c) milling the dried and cured mixture to form a clay-bearing grease.

15. A clay-bearing grease composition prepared by the method which comprises:

(a) forming a clay hydrogel of clay of sufficient ion exchange capacity and water;

(b) intimately mixing therewith a conjugate acid surfactant formed from an acid and an organic amine compound;

(c) intimately mixing with the mixture formed in step (b) a major proportion of lubricating oil whereby a water phase and pre-grease phase comprising curds of oil, clay, surfactant and minor amounts of water are formed;

(d) separating the water phase from the wet pre-grease phase;

(e) mixing and reacting with the amine groups of the amine in the pre-grease from about 0.1 to about 20 weight percent of an epoxide, based upon the weight of the pre-grease;

(f) heating the mixture [to a temperature not greater than 250°] to cure the epoxide; and (g) milling the dried and cured mixture to form the clay-bearing grease.

16. The grease of claim 15 wherein the clay is a bentonitic clay.

17. The grease of claim 15 wherein the clay is a hectorite clay.

18. The grease of claim 15 wherein the epoxide is a monoepoxide or polyepoxide having epoxy equivalent values of from 1.5 to about 4.

19. In the method for preparing a clay-bearing grease which comprises mixing an aqueous clay hydrogel and a conjugate acid surfactant formed from an acid and an organic amine, which mixture is combined, with mixing, with a major proportion of a lubricating oil to result in a pre-grease phase containing the oil, clay and surfactant and a water phase; followed by separating the pre-grease phase from the water phase; the improvement which comprises:

(a) mixing with the pre-grease, from about 0.1 to about 20 weight percent of an epoxide, based upon the weight of the pre-grease;

(b) heating the mixture to a temperature not greater than 250° F. to dehydrate the pre-grease and cure the epoxide; and (c) milling the dried and cured mixture to form a clay-bearing grease.

* * * * *